United States Patent [19]

Cotter et al.

[11] 4,248,454
[45] Feb. 3, 1981

[54] SUSPENSION STRUT ISOLATOR MOUNT

[75] Inventors: Thomas N. Cotter, Milford; Robert L. Carter, Gibraltar; Sebastian J. Giuffrida, Bloomfield Hills, all of Mich.

[73] Assignee: Chrysler Corporation, Highland Park, Mich.

[21] Appl. No.: 40,619

[22] Filed: May 21, 1979

[51] Int. Cl.³ .............................................. B60G 11/56
[52] U.S. Cl. ..................................... 280/668; 280/710
[58] Field of Search ...................... 280/668, 96.1, 671, 280/716, 710; 267/63 R, 64 B

[56] References Cited

U.S. PATENT DOCUMENTS

| 3,346,272 | 10/1967 | Smith | 280/668 |
|---|---|---|---|
| 3,954,257 | 5/1976 | Keijzer | 280/668 |
| 4,042,259 | 8/1977 | Fiedler | 280/668 |
| 4,105,222 | 8/1978 | Buchwald | 280/668 |
| 4,188,047 | 2/1980 | Crean | 267/63 R |

Primary Examiner—Robert R. Song
Attorney, Agent, or Firm—Newtson & Dundas

[57] ABSTRACT

An improved suspension strut isolator mount provides a compact resilient isolator assembly configured to facilitate mold bonding of an elastomeric member between a functional member of the strut and an auxiliary sleeve member and press fit insertion of the assembly into a relatively large strut mounting member.

3 Claims, 2 Drawing Figures

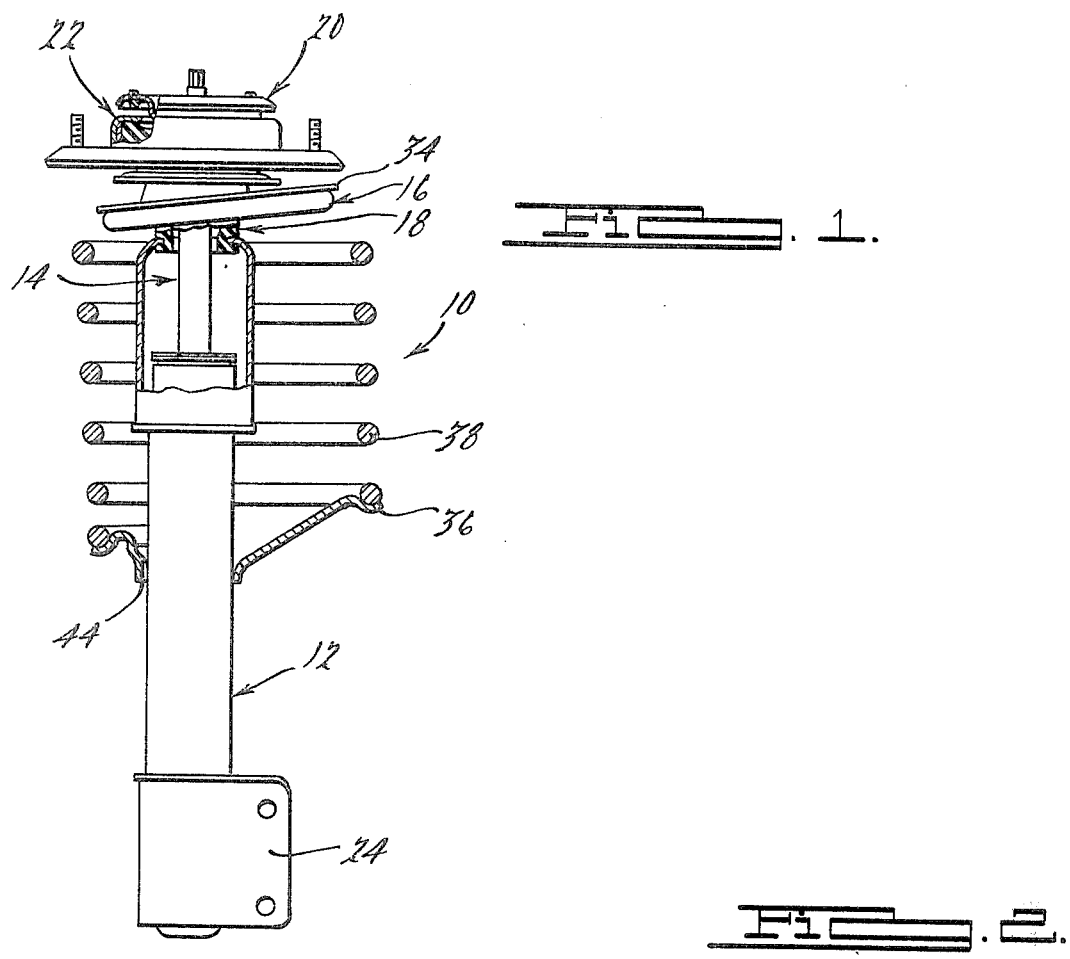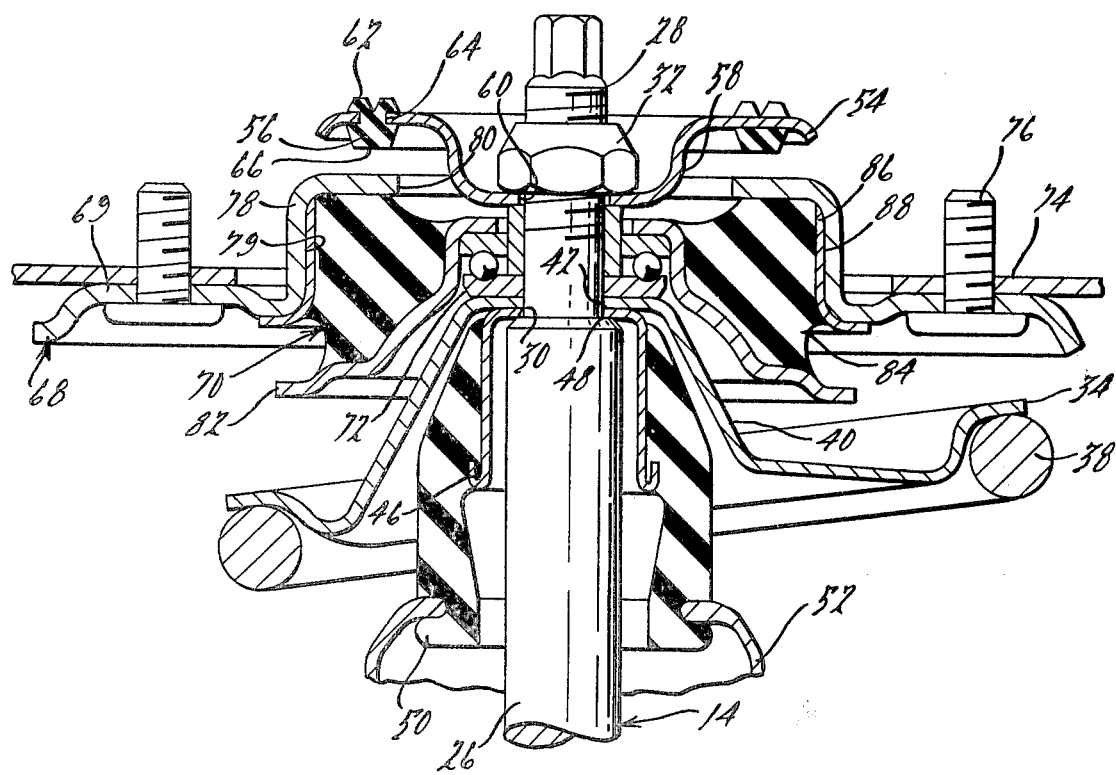

SUSPENSION STRUT ISOLATOR MOUNT

BACKGROUND OF THE INVENTION

1. Field of Invention

The present invention relates generally to vehicle suspension struts and more specifically to resilient isolator mounts therefor.

2. Description of the Prior Art

It is well known in the prior art to provide resilient isolator assemblies for mounting suspension struts of independently suspended vehicle wheel assemblies to vehicle bodies. U.S. Pat. No. 2,624,592 to MacPherson is exemplary of early means for effecting a certain amount of cushioned angular freedom for a suspension strut mounted between a vehicle's wheel and a portion of its body. As the so-called "MacPherson-type" suspension systems have come into widespread use, more efficient and economical isolator assemblies have been developed. One such improved assembly employs an elastomeric isolating member formed in a mold encompassing a bearing retainer positioned above the upper spring seat of the strut and the mounting place through which attachment to the vehicle body is effected. This type of isolator construction, referred to in the art as a "mold bonded" isolator has been found to be effective and economical. Copending application Ser. No. 3,319 of Pacis and Youngdale, assigned to the assignee of the present invention illustrates such an isolator assembly.

One disadvantage has been encountered, however, in the construction of such isolator assemblies. When a relatively large diameter mounting plate is required in the vehicle construction, this necessitates the use of an uneconomically large and complex mold for effecting in situ molding and bonding of the elastomeric isolating member.

SUMMARY OF THE INVENTION

Responsive to the disadvantages of the prior art, it is an object of the present invention to provide a resilient isolator assembly for mounting a vehicle suspension strut of a MacPherson-type suspension system to a vehicle body which assembly is simple and economical to produce.

It is another object to provide such a resilient isolator assembly whose simple and economical construction is independent of the size and configuration of the rigid mounting structure utilized for connection to the vehicle body.

According to a feature of the present invention, a resilient isolator assembly is provided in which an elastomeric member is mold bonded between the bearing retainer of the suspension strut and a sleeve configured for press fit engagement with the mounting plate provided for rigid connection to the vehicle body.

BRIEF DESCRIPTION OF THE DRAWING

These and other objects and features will be apparent to those skilled in the vehicle suspension arts upon reading the following detailed description with reference to the accompanying drawing in which:

FIG. 1 is an elevational view, certain parts sectioned for clarity, of a vehicle suspension strut embodying the resilient isolator mount of the present invention; and FIG. 2 is an enlarged cross sectional view of the upper portion of the strut of FIG. 1 illustrating the invention isolator mount.

DESCRIPTION OF THE PREFERRED EMBODIMENT

Referring now to the drawing and particularly to FIG. 1, a suspension strut 10 of the type generally employed in MacPherson-type independent wheel suspension systems is illustrated as generally comprising a tubular housing assembly 12, a rod member 14 received in the housing 12, a coil spring assembly 16, a jounce bumper assembly 18, a rebound bumper assembly 20, and a resilient isolator assembly 22.

The tubular housing assembly 12 and the rod member 14 cooperate in a known manner to function as a hydraulic spring action modifier in a vehicle suspension system. Adjacent the lower end of the housing assembly 12 is a mounting plate 24 whereby the strut 10 may be secured to the wheel assembly of a vehicle (not shown).

Turning next to FIG. 2, the rod member 14 is illustrated as including a lower smooth portion 26 telescopingly received in the housing assembly 12 and an upper threaded portion 28. An upward facing shoulder 30 is formed between lower and upper rod portion 26, 28. An internally threaded fastener such as the nut depicted at 32 is threadedly received on the upper threaded rod portion 28 for making portions of the coil spring assembly 16, the jounce bumper assembly 18, the rebound bumper assembly 20, and the resilient isolator assembly 22 axially fast against the shoulder 30.

The coil spring assembly 16 includes an upper canted spring seat member 34, a lower seat member 36, and a coil spring 38. The upper seat member 34 includes an upward extending conical projection 40 having an aperture 42 formed through it to permit assembly of the seat member 34 over the threaded rod portion 28 to the position shown in FIG. 2. Lower seat member 36 is fixedly secured as by welding to the housing 12 and preferably includes a drain passage as indicated at 44 to prevent the undesirable collection of moisture. The spring 38 is carried between the seat members 34, 36 in a manner effecting an offset with respect to the axis of the rod member 14 and the housing 12 as is well known in the vehicle suspension arts.

The jounce bumper assembly 18, as may best be seen in FIG. 2, is of the type shown in copending application Ser. No. 3,319 of Pacis and Youngdale assigned to the assignee of the present invention. It includes a rigid, cup-shaped stop member 46 having an aperture 48 sized to permit its assembly over the threaded rod portion 28 to the position abutting the shoulder 30 shown in FIG. 2. A cushion member 50 is bonded to the stop member 46 and carries a dust shield 52 for protecting the exposed portion of the rod member 14. The jounce bumper assembly 18 functions to cushion and limit inward telescoping of rod members with respect to the housing 12 as more fully described in the above cited application.

The rebound bumper assembly 20 includes a rebound retainer 54 and a bumper ring 56. The rebound retainer 54 is preferably formed as a generally disc-shaped stamping having a central depression 58 through which is formed an aperture 60 to permit assembly over rod threaded portion 28. The bumper ring 56 is formed as a ring of resilient material having a plurality of projections 62 received in snap fit relationship through holes 64 formed through the rebound retainer 54. It thus presents an annular surface 66 cushioning movement of the rebound bumper assembly 20 into abutment with the resilient isolator assembly 22.

The resilient isolator assembly 22 of the present invention is illustrated in FIG. 2 as consisting essentially of a mounting plate 68 and an isolator subassembly 70. The mounting plate 68 is formed as a relatively massive, cup-shaped stamping having a flange portion 69 that is secured to a body member, indicated at 74, of a vehicle through conventional fastening means such as bolts 76. The plate 68 includes a central raised projection 78 defining a cavity for receiving the isolator subassembly 70 and an aperture 80 formed through the projection 78 for receiving portions of the rebound bumper assembly 20 and the rod member 14.

A thrust bearing 72 is carried on the rod member 14 between the upper spring seat member 34 and the rebound retainer 54 and is carried on its outer diameter by a bearing retainer member 82 of the isolator subassembly 70.

The isolator subassembly 70 further consists of an isolator member 84 and a mounting sleeve 86. The subassembly 70 functions in the conventional manner to cushion angular movement of the telescoping rod and housing members 14, 12. It accomplishes this function, however, in the illustrated uniquely economical construction. The bearing retainer member 82, the isolator member 84, and the mounting sleeve 86 together form a compact subassembly in which the isolator member 84, which is preferably a moldable elastomer, is mold bonded in situ between the retainer 82 and the sleeve 86, thus eliminating the need to accommodate a large structure such as the mounting plate 68 in constructing the molds. The resulting subassembly includes an outer peripheral surface 88 defined by the mounting sleeve 86 which is sized to be received in press fit relationship within the inner peripheral surface 79 of the cavity defined by mounting plate projection 78. A radially extending flange portion 87 may be formed with the sleeve 86 to facilitate assembly by defining an assembly travel limiting abutment with the mounting plate 68 and providing a convenient surface to engage in effecting the press fit insertion.

While only one embodiment of the suspension strut isolator mount of the present invention has been described, those skilled in the vehicle suspension art will appreciate that others may be possible without departure from the scope of the appended claims.

What is claimed is:

1. In a vehicle suspension strut of the type having a telescoping rod and housing assembly including means for attachment to a vehicle wheel assembly, a thrust bearing carried proximate the upper end of the rod, and a mounting plate including means for attachment to a vehicle body at positions circumferentially arranged with respect to the rod and housing assembly, a resilient isolator assembly comprising:

A. an annular bearing retainer member of substantially smaller cross-sectional area than said mounting plate receiving the upper end of said thrust bearing;
B. a sleeve member receivable in press fit relationship with said mounting plate substantially coaxial with said rod and housing assembly and displaced substantially radially inwardly from said mounting plate attachment means positions; and
C. an elastomeric isolator member mold bonded in situ between said bearing retainer member and said sleeve member to form a subassembly received in press fit relationship by said mounting plate.

2. A vehicle suspension strut comprising:
A. a tubular housing assembly including means disposed proximate the lower end thereof for attachment to a vehicle wheel;
B. a rod member telescopingly received in said housing assembly and having a free end extending upwardly therefrom;
C. a spring assembly surrounding said housing assembly and said rod member and including:
   1. a lower spring seat member secured to said housing assembly;
   2. an upper spring seat member secured to said rod member proximate said free end; and
   3. a coil spring carried between said seat members;
D. a thrust bearing carried on said rod member above said upper spring seat member;
E. a generally disc-shaped mounting plate member having:
   1. an annular flange portion including means for attachment to the body of a vehicle; and
   2. means defining an axially extending cylindrical cavity positioned substantially radially inwardly with respect to said flange portion; and
F. a resilient isolator assembly having means for receiving the upper end of said thrust bearing and nonresilient means for engaging said mounting plate cavity in press fit relationship.

3. A vehicle suspension strut as defined in claim 2 wherein said resilient isolator assembly comprises:
   1. a bearing retainer member surrounding said rod member and including means for receiving the outer diametral surface of said bearing and for abuttingly engaging the upper end of said bearing;
   2. a generally tubular sleeve member having an outer diameter sized for press fit insertion into said mounting plate member cylindrical cavity; and
   3. a generally cylindrical isolator member mold bonded in situ between said bearing retainer member and said sleeve member to form an isolator subassembly of minimal cross-sectional area insertable in press fit relationship into said mounting plate member cylindrical cavity.

* * * * *